F. MONTE.

DISHWASHING MACHINE.

APPLICATION FILED NOV. 3, 1919.

Reissued Jan. 10, 1922. 15,264.

2 SHEETS—SHEET 1.

Inventor

Fred Monte.

By Charles L. Wright his Attorney

F. MONTE.
DISHWASHING MACHINE.
APPLICATION FILED NOV. 3, 1919.
Reissued Jan. 10, 1922. 15,264.
2 SHEETS—SHEET 2.
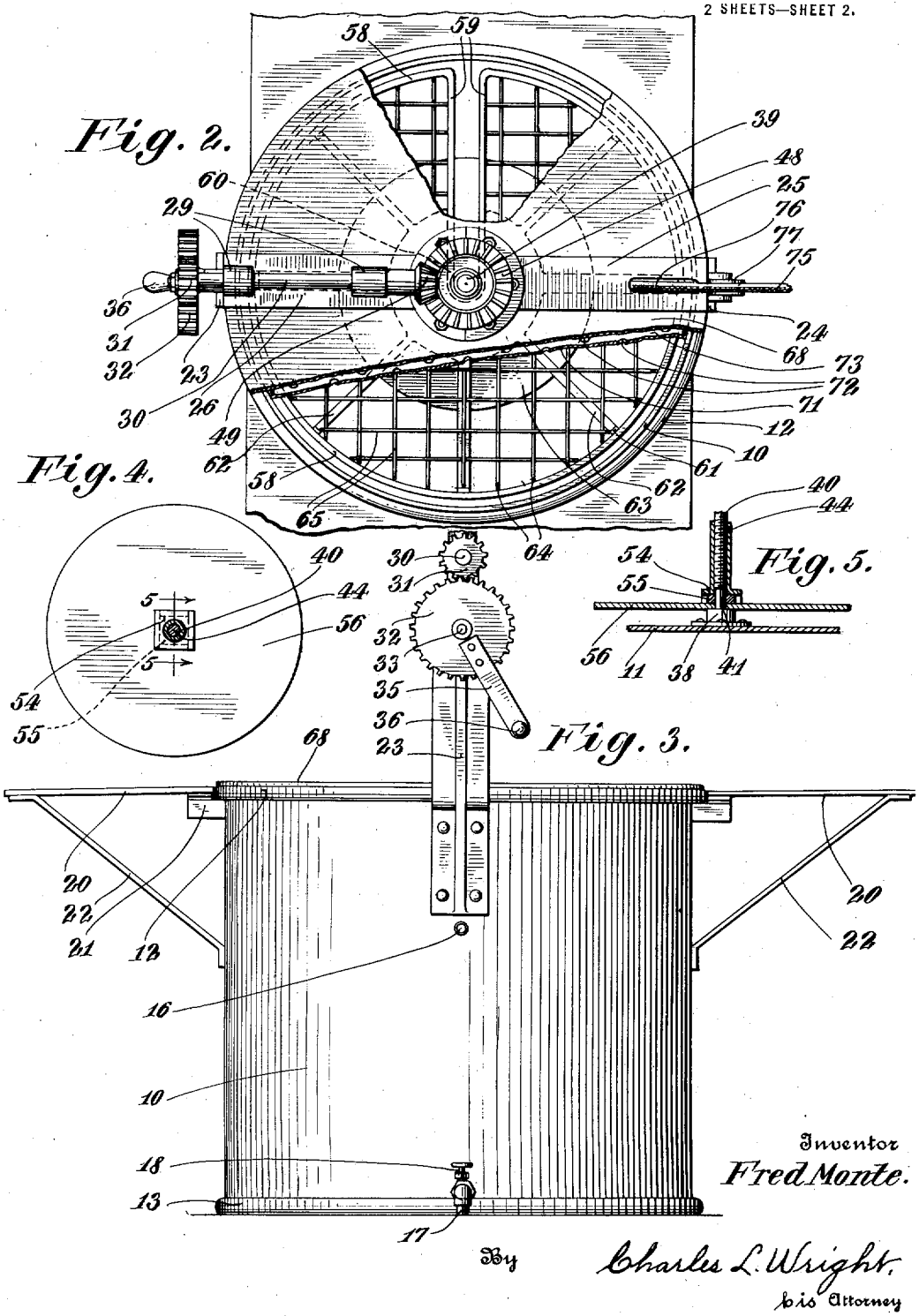
Inventor
Fred Monte.
By Charles L. Wright,
his Attorney

UNITED STATES PATENT OFFICE.

FRED MONTE, OF NEWARK, NEW JERSEY.

DISHWASHING MACHINE.

15,264. Specification of Reissued Letters Patent. Reissued Jan. 10, 1922.

Original No. 1,312,414, dated August 5, 1919, Serial No. 254,442, filed September 17, 1918. Application for reissue filed November 3, 1919. Serial No. 335,507.

*To all whom it may concern:*

Be it known that I, FRED MONTE, a citizen of the United States, and a resident of Newark, in the county of Essex and State of New Jersey, have invented certain new and useful Improvements in Dishwashing Machines, of which the following is a specification.

This invention has as its principal object to provide an apparatus adapted particularly to rapidly and thoroughly wash any of the ordinary forms of cookery used for serving food under the generic term of dishes, the washing process being accomplished in the presence of a supply of hot water containing soap in any preferred form, so as to readily remove grease, dirt and adherent food particles.

A further object is to provide means whereby the apparatus is easily manually operated, the dish basket being raised or lowered and also rotated, causing the water to circulate thoroughly between the dishes.

Another object is to provide means whereby the basket may be entered or removed from the tank in a convenient manner, supports acting as trackways for the basket being provided for that purpose.

Still another object is in the provision of means for rinsing the contents of the basket with clean water after the washing operation, when in a raised position, and before removal from the tank.

These and other like objects which will become more fully manifest as the description progresses, are attained by the novel construction, combination and arrangement of parts and principles hereinafter described and shown in the accompanying drawings, forming a material part of this specification, and in which:—

Figure 2 is a top plan view of the same, parts being broken away to show the construction.

Figure 3 is a front elevational view thereof, the center bar being broken off at the top.

Figure 4 is a fragmentary transverse sectional view taken on line 4—4 of Figure 1, and Figure 5 is a vertical sectional view taken on line 5—5 of Figure 4.

Figure 1:
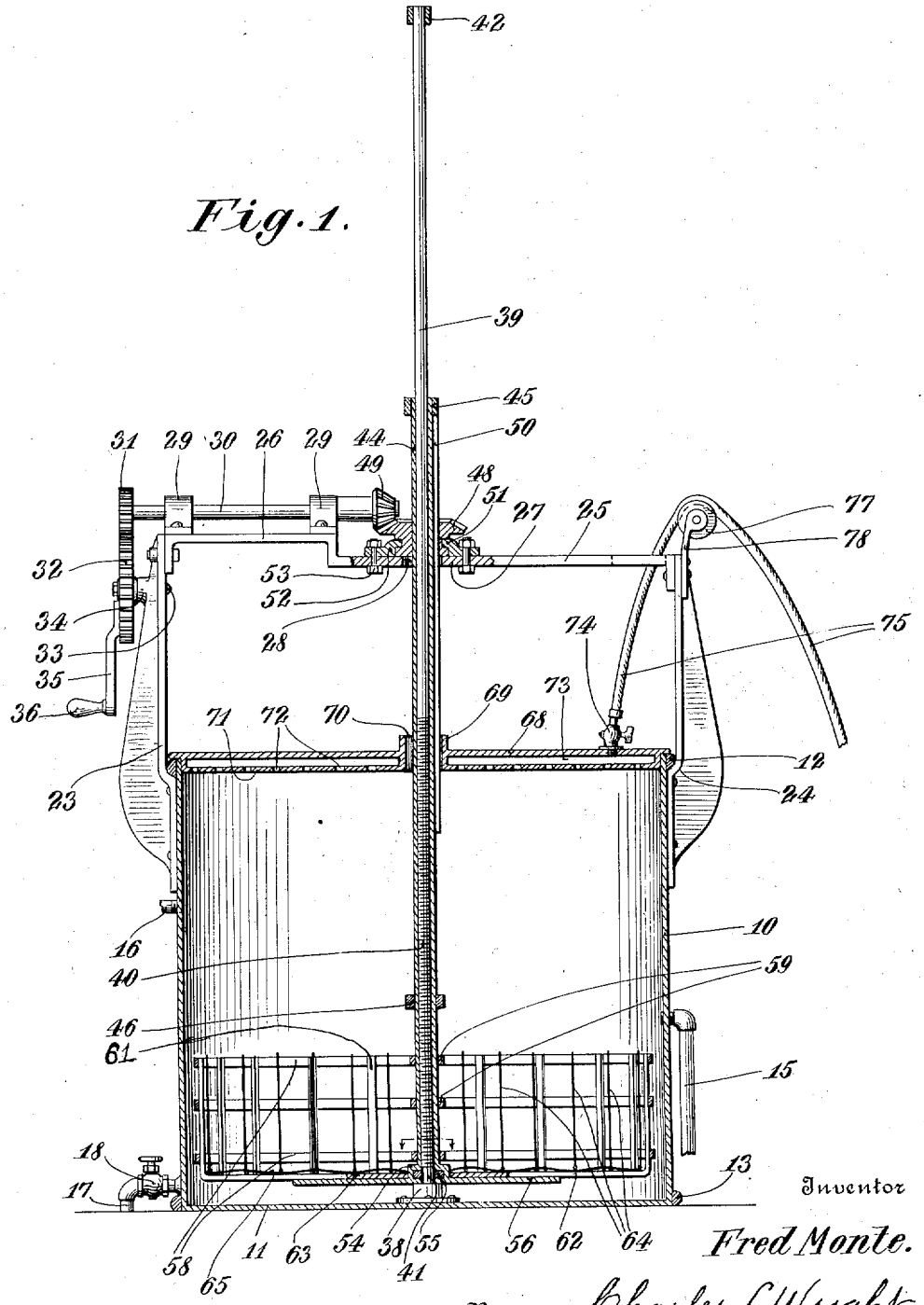
Figure 1 is a partial side elevational and partial vertical sectional view, the section being taken approximately through the center of an apparatus made in accordance with the invention.

Referring to the drawings in detail, the numeral 10 designates a vertical cylindrical tank or tub having a tight closed bottom 11 and re-enforced by bead-like bands 12 and 13 at the top and bottom edges respectively.

An inlet pipe 15, leading from a source of supply of water, preferably hot, enters the tank at a point slightly below the middle of its height, while an overflow pipe 16, entering the tank at a point nearer the top, communicates with a drain in the usual manner as does the outlet or discharge pipe 17, entering the tank adjacent the bottom and which is provided with a central valve 18.

Extending laterally outward, in opposite directions and level with the top of the tank are platforms 20, secured at their inner edges to the band 12 or brackets 21 and supported near their outer ends by diagonally disposed struts 22, their ends being bent and fastened by rivets in the manner indicated.

At opposed points, substantially ninety degrees from the pair of platforms 20, there are fixedly secured to the upper portion of the tank, a pair of ribbed brackets 23 and 24, having fastened between their raised, parallel flat inner faces, a flat, rigid cross-bar 25 formed with a stepped upper portion 26 at the end adjacent the bracket 23, and having at its center an outwardly curved level enlargement 27 containing a central opening 28.

Rigidly mounted on the raised portion 26 of the cross-bar are a pair of journal bearings 29, carrying a horizontal, revoluble shaft 30 upon the outer end of which is fixed a spur pinion 31 meshing with a gear 32 revoluble on a stud 33 fixed in a boss 34 formed with the bracket 23, the gear 32 being provided with a projecting lever 35 in the outer end of which is set a manually operable knob or handle 36.

Permanently secured at the center of the tank bottom plate 11 is a step bracket 38 adapted to receive and rigidly hold the lower end of a round bar 39, the same extending to a considerable height above the tank and having formed on its lower portion a screw thread 40, below which is a short plain reduced portion 41, the extreme top of the bar having fixed upon it a cap or collar 42.

Circumjacent to the bar is a tubular sleeve 44, the same extending substantially two thirds of the length of the bar and being provided with a fixed collar 45 at its upper end, and another fixed collar 46 on its lower portion, the purpose of which will be further on explained.

The sleeve passes freely through the opening 28 and is slidably engaged in the hub of a bevel gear 48, driven by a bevel pinion 49 fixed on the inner end of the horizontal shaft 30.

The hub of the bevel gear is splined to receive a key 50 fixed in the upper half length of the sleeve 44 so that when the handle 36 is actuated the sleeve will be rotated.

The lower extending portion of the bevel gear hub, above the top of the cross bar 25, has formed in it an annular recess in which are engaged the inner, tenon-like elements 51 of a combined clamp and support bracket 52 split along its center line and held to the cross rail element 27 by the bolts 53.

Rigidly secured to the lower end of the sleeve 44 is a rectangular casing 54 adapted to contain a nut or screw threaded block 55 engageable with the threads 40 of the center bar, while secured to the bottom of the casing, so as to hold the nut in operative position is a circular plate or disc 56.

The dish basket is comprised of a plurality of bands 58, of lesser diameter than the interior of the tank, and at one point in each of the several bands the material is bent inwardly forming parallel arms 59 joined by integral curved loops 60, adapted to receive the sleeve 44, in the bight of the loops, thereby centering the basket and elements 58 which are held in spaced relation by vertical strips 61, turned angularly inward and forming radial supports or braces 62, their inner ends being secured to a disc 63 forming the center of the basket bottom.

Interposed between the strips 61 are a plurality of wires 64, bent and interlaced, forming a meshed bottom 65 capable of retaining dishes but allowing liquids to pass freely through the interstices between the wires.

A cover plate 68 rests normally upon the upper edge of the tank, the plate having formed with it a central hub 69 containing an opening 70 through which the sleeve 44 and key 50 freely passes.

Attached to the lower end of the hub and an inner rim formed with the cover plate, is another plate 71 containing a plurality of small perforations 72 communicating with the space 73 between the plates 68 and 71 and entering into the space is the nozzle of a valve 74 connected to a flexible hose 75, passing upward through a slot 76 in the cross bar 25 and thence over a guide pulley 77 mounted in a bracket 78 fixed upon the outer, upper portion of the bracket 24, and leading from a supply of water.

In operation, the dish basket is disposed upon one of the platforms 20 and the articles to be cleaned deposited in the basket, which is then pushed along the platform to engage on the surface of the disc 56, at that time raised to the level of the platforms.

The arms 59, forming in effect a slot in the bracket, serve to guide and centralize the same upon the sleeve 44, which can now be rotated by means of the gear couples upon actuating the handle 36.

This rotative movement causes the nut 55, engaged with the screw-threads 40, to move downward, carrying the disc and basket to the bottom of the tank and obviously rotating the basket as it descends.

Water may enter from the inlet 15 to the heighth of the overflow 16, and soapy matter added as required.

Due to the mechanism the basket may be rotated in either directions when in its lowest position the nut 55 turns freely upon the reduced end 41 of the rod, the nut being re-engaged by manually raising the sleeve 44 when it is desired to raise the basket and its contents, the collar 45 limiting its upward movement by contact with the rod collar 42.

It will be understood that when the washing apparatus is taking place, the cover 68 is positioned on top of the tank, to prevent the water from being splashed upon the floor, and it will be clear that when the operation is completed the dirty water may be discharged from the tank by opening the valve 18.

After washing the articles they may be thoroughly sprayed and rinsed by minute streams of water—preferably hot—delivered through the perforations 72 from the annular space 73 formed in the cover plate and supplied by the flexible tube 75.

Upon engaging the nut with the screw and actuating the handle 36, the sleeve and basket are raised, causing contact of the collar 46 with the hub 69 of the cover, and raising the same until the bottom of the basket is again level with the platforms 20 so that it may be moved outward thereon and the dishes removed in a cleansed condition, space between the collar 46 and top of the basket being ample to permit the basket to move freely outward, while the flexible hose 75 passes easily over the pulley 77 as the cover rises.

Having thus described my invention, what I claim as new and desire to secure by Letters Patent, is:—

1. In a washing machine, the combination with a tank and a basket operable therein, of a fixed central vertical bar, means in conjunction with said bar for supporting and guiding said basket and for imparting coincidentally linear and rotary motion to said basket, said basket being provided with means for permitting lateral engagement or disengagement with said bar and said first named means.

2. In a washing machine, the combination with a tank, and an upright threaded member centrally and rigidly disposed therewithin, of a basket, a nut carried in a recess at the bottom of said basket having threaded connections with said upright member, and means including a gear train for rotating said basket whereby it is caused to raise or lower depending upon the direction of rotation imparted to it.

3. In a washing machine, the combination with a cylindrical tank and a vertical bar rigidly engaged at the center of said tank, of a sleeve movable on said bar, a disk fixed on the bottom of said sleeve, a basket operable in said tank adapted to rest on said disc, said basket having a radial guide slot adapted to receive said sleeve, and means for actuating said sleeve.

4. In a washing machine, the combination with a tank and a threaded upright bar, of a basket having threaded connections with said bar, and means for rotating said basket causing it to raise or lower, the threads of said bar terminating at a point above its lower end so that said basket may rotate without an accompanying vertical movement when said basket is in a lowermost position.

5. In a washing machine, the combination with a cylindrical tank and a vertical bar rigidly engaged at the center of its bottom, of a sleeve movable on said bar, a key fixed on said sleeve, a gear in which said sleeve and key are slidably engaged, means for actuating said gear in either direction, means on said sleeve and bar adapted to cooperate for raising or lowering said sleeve when said gear is actuated, an open mesh basket, and means on said sleeve adapted to receive and support said basket.

6. In a washing machine, the combination with a tank and a threaded upright bar mounted therein, of a sleeve embracing said bar, a disc fixed at the bottom of said sleeve a threaded connection between said sleeve and bar, a basket mounted on said disc, brackets secured to said tank, a cross bar mounted on said brackets having an opening to receive said sleeve, a bevel gear mounted on said cross-bar, a key slidably connecting said gear and sleeve, a shaft journalled in bearings on said cross-bar, a bevel pinion on said shaft meshing with said gear, and means for rotating said shaft.

7. In a washing machine, the combination with a vertical cylindrical tank, a bar fixed centrally on the bottom of said tank, said rod having a screw-thread on its lower third, of a sleeve circumjacent to said bar, gear couples for rotating said sleeve, a disc carried at the lower end of said sleeve, a nut housed on said disc engageable with the screw-threaded portion of said bar whereby said sleeve may be raised or lowered, and an open meshed basket freely receivable in said tank adapted to rest upon said disc, said basket being formed with means receptive of said sleeve whereby said basket and sleeve may be placed concentric.

8. In a washing machine, the combination with a tank and an upright bar secured centrally therein, of an open mesh basket having upright walls and a radial slot extending in the manner of a loop circumjacent its center, said bar being entrable therein, a sleeve on said bar for operating said basket, and means for actuating said sleeve.

FRED MONTE.